Oct. 14, 1952 M. R. ELLIOTT ET AL 2,613,828
INDUSTRIAL TRUCK
Filed Nov. 3, 1949 3 Sheets-Sheet 1

INVENTOR.
MORRIS R. ELLIOTT
GEORGE L. TURNER
BY
ATTYS

Oct. 14, 1952   M. R. ELLIOTT ET AL   2,613,828
INDUSTRIAL TRUCK

Filed Nov. 3, 1949   3 Sheets-Sheet 3

INVENTOR.
MORRIS R. ELLIOTT
GEORGE L. TURNER
BY
ATTYS.

Patented Oct. 14, 1952

2,613,828

UNITED STATES PATENT OFFICE 2,613,828

INDUSTRIAL TRUCK

Morris R. Elliott, Buchanan, and George L. Turner, Niles, Mich., assignors to Clark Equipment Company, Buchanan, Mich., a corporation of Michigan Application November 3, 1949, Serial No. 125,278

7 Claims. (Cl. 214—112)

Our invention relates generally to industrial trucks and is more particularly directed to an industrial truck of a character which may be manipulated in confined areas.

It is necessary at the present time in warehouses to maintain the width of aisles substantially in excess of the over-all length of an industrial truck and its associated load supporting means in order that the truck may be maneuvered into a position so that a pallet supported load carried thereon may be deposited in a row adjacent the aisle and the forks of the load supporting means withdrawn from under the pallet.

It is an object of our present invention to provide an industrial truck of a character in which the upper main frame of the truck and the load supporting means carried thereon may be revolved about a point intermediate of the sides and ends of the lower main frame of the truck to enable manipulation of the truck in confined areas.

It is a further object of our invention to provide an industrial truck of the character last referred to in which the load supporting means is in the form of horizontally extending fork means pivoted at the heel thereof for rotation with or relative to the upper main frame of the truck to provide for maximum maneuverability of the truck.

By providing a truck and load supporting means of the character indicated, it is possible to reduce the width of aisles in storage areas. For example, in depositing a load at the end of a row, the truck may be driven down the aisle to the position where the load is to be deposited. The upper main frame of the truck may then be revolved until the load supporting means assumes a position substantially in alignment with the area wherein the pallet supported load is to be deposited. After the pallet has been lowered to engage the ground the upper main frame may be revolved back to its original position since the forks in this instance may pivot or rotate about their pivotal connections in being withdrawn from below the deposited load. Likewise a pallet at the end of a row may be picked up by maneuvering the truck in such a manner that the truck is edged forwardly simultaneously while the forks are being rotated and the upper main frame is being revolved. It will thus be realized that the truck of our invention may be maneuvered in aisles having a width only slightly in excess of the length of the truck whereas conventional trucks may only be maneuvered in aisles having a width in excess of the over-all length of the truck and the load supporting means carried thereby.

Now in order to acquaint those skilled in the art with the manner of constructing and using devices in accordance with the principles of our present invention, we shall describe in connection with the accompanying drawings, a preferred embodiment of our invention.

Figure 1:
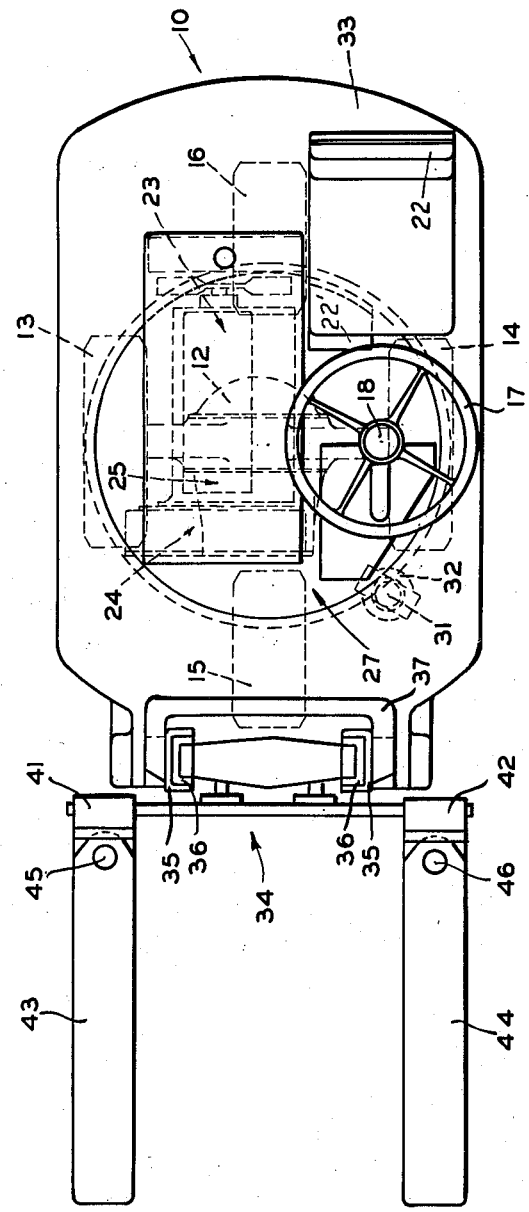
Figure 1 is a plan view largely diagrammatic, of a revolving lift truck embodying the principles of our present invention.
Figure 2:
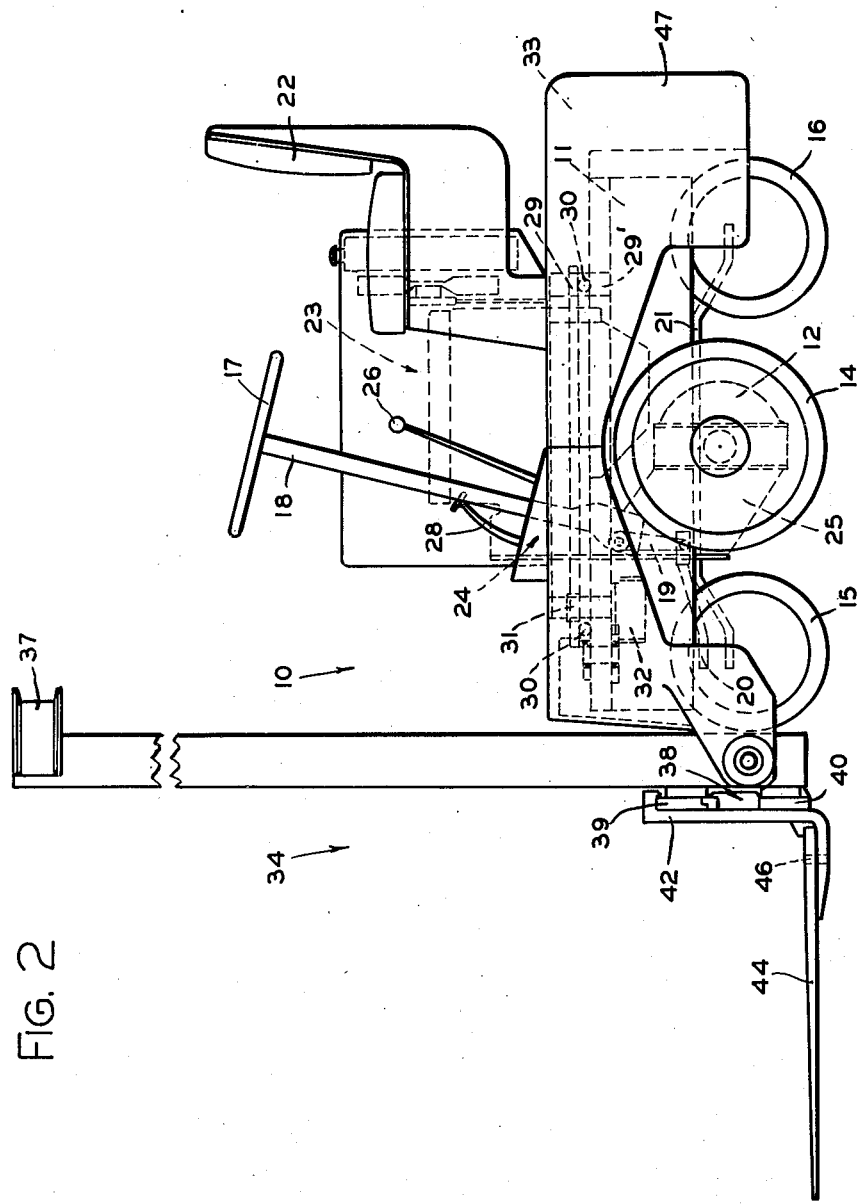
Figure 2 is a side elevational view of the truck shown in Figure 1.

Referring now to the drawings, there is shown an industrial truck, indicated generally by the reference numeral 10, constructed in accordance with our invention. The various elements comprising the truck 10 are shown somewhat diagrammatically and in that the elements per se form no part of the present invention, a detailed showing and description thereof is thought to be unnecessary. The truck 10 comprises a lower main frame 11 having mounted centrally of its ends an axle and differential housing 12 through which drive is effected to a pair of drive wheels 13 and 14, one of which is disposed adjacent each side of the truck 10. Pivotally mounted in any suitable manner to the lower main frame 11 adjacent each end of the truck centrally of the sides thereof are a front steering wheel 15 and a rear steering wheel 16. Rotary movement about a vertical axis is imparted to the steering wheels 15 and 16 by means of a hand steering wheel 17 which is secured to the upper end of a steering column 18 mounted on the lower frame 11 and connected through a suitable crank arm 19 and a link 20 to the front steering wheel 15. The front and rear steering wheels 15 and 16 are inter-connected by means of a suitable link 21 for effecting rotation of rear wheel 16 in an opposite direction to that of the front wheel 15 in response to turning movement of hand steering wheel 17 in the steering and turning of the truck.

Mounted on the lower main frame 11 adjacent the steering column 18 is the lower leg portion 22' of an operator's seat 22. Also carried by the lower frame 11 is a prime mover 23, which may, for example, take the form of a conventional internal combustion engine, together with standard clutch and transmission means indicated generally at 24 and 25 respectively, and pump means (not shown) for developing fluid under pressure which is used to actuate the various hydraulic actuating means to be hereinafter described. A gear shift lever 26, a brake pedal 28, and other controls (not shown) for the several hydraulic actuating means are provided adjacent the steering column 18 for the operator. The prime mover 23 is located at one side of the truck centrally of the ends thereof and generally laterally of a vertical median plane extending lengthwise of the truck. The operator's seat 22 is located at the other side of the truck laterally of the vertical median plane extending lengthwise of the truck and rearwardly of a vertical plane passing through the axis of the drive wheels of the truck.

Disposed about and encompassing the lower main frame 11 is an upper main frame 33 which comprises an upper plate or panel member in which an opening indicated at 27 is formed. The opening 27 is of sufficient extent to provide the extension therethrough of the lower leg portion 22' of the operator's seat 22, steering column 18, prime mover 23, clutch means 24, and the various control levers, all of which are carried or supported by the lower main frame 11. The upper main frame 33 further comprises skirt plates or panels which depend downwardly from the upper plate or panel at the sides and ends thereof. Secured to and below the upper panel of the upper main frame 33 is a ring gear 29. The ring gear 29 as shown, lies immediately inwardly of the opening 27. The lower main frame immediately below the ring 29 supports a bearing race member 29' and a plurality of ball bearings 30 are arranged between member 29' and the ring gear 29. A pinion 31 carried by a suitable shaft journalled on the lower main frame has meshing engagement with the ring gear 29. The shaft carrying pinion 31 may be driven, for example, by means of a conventional hydraulic motor 32 mounted to the lower main frame 11. The hydraulic motor 32 may in turn be driven by fluid under pressure delivered thereto from the aforementioned pump means carried by the truck.

It will thus be seen that when it is desired to revolve the upper main frame 33 an appropriate control is manipulated and fluid under pressure is permitted to flow from the pump means to the hydraulic motor 32 which effects rotation of the same. The pinion 31 is thus rotated by the hydraulic motor 32 and the pinion 31 drives the ring gear 29 which causes the upper main frame 33 to revolve.

Mounted to the forward end of the upper main frame 33 is a conventional mast 34 which comprises vertically extending channel members 35—35 and 36—36, which are actuated upwardly and downwardly by means of a conventional hydraulic piston and cylinder assembly (not shown) disposed within the confines of the channel members 35—35 and 36—36. The channel members 35—35 are secured adjacent their upper ends by means of a U-shaped bracket member 37. Supported within the channel members 36—36 is a carriage means 38 comprising a pair of plate members 39 and 40 which extend transversely of the truck. Hooked over the upper transverse plate 39 adjacent each end thereof and bolted to the lower transverse plate 40 are a pair of load supporting frames 41 and 42 to which a pair of forwardly extending fork members 43 and 44 are pivotally supported adjacent their heels on stub shafts 45 and 46.

The forks 43 and 44 are adapted to be pivoted about the stub shafts 45 and 46 thus permitting the ends of the forks 43 and 44 to enter under a pallet before the upper main frame 33 has been revolved into alignment with the pallet. The forks 43 and 44 may be mechanically rotated by means shown and described, for example, in the copending application of Robert Lapsley and George L. Turner, one of the joint applicants of the present invention, Serial No. 100,684, filed June 22, 1949.

A counterweight 47 of suitable mass, depending on the size and load carrying capacity of the truck, is provided adjacent the rear of the upper main frame 33 so as to be disposed opposite the load supporting means.

The following is a description of a typical loading and unloading operation of the truck.

Figure 3:
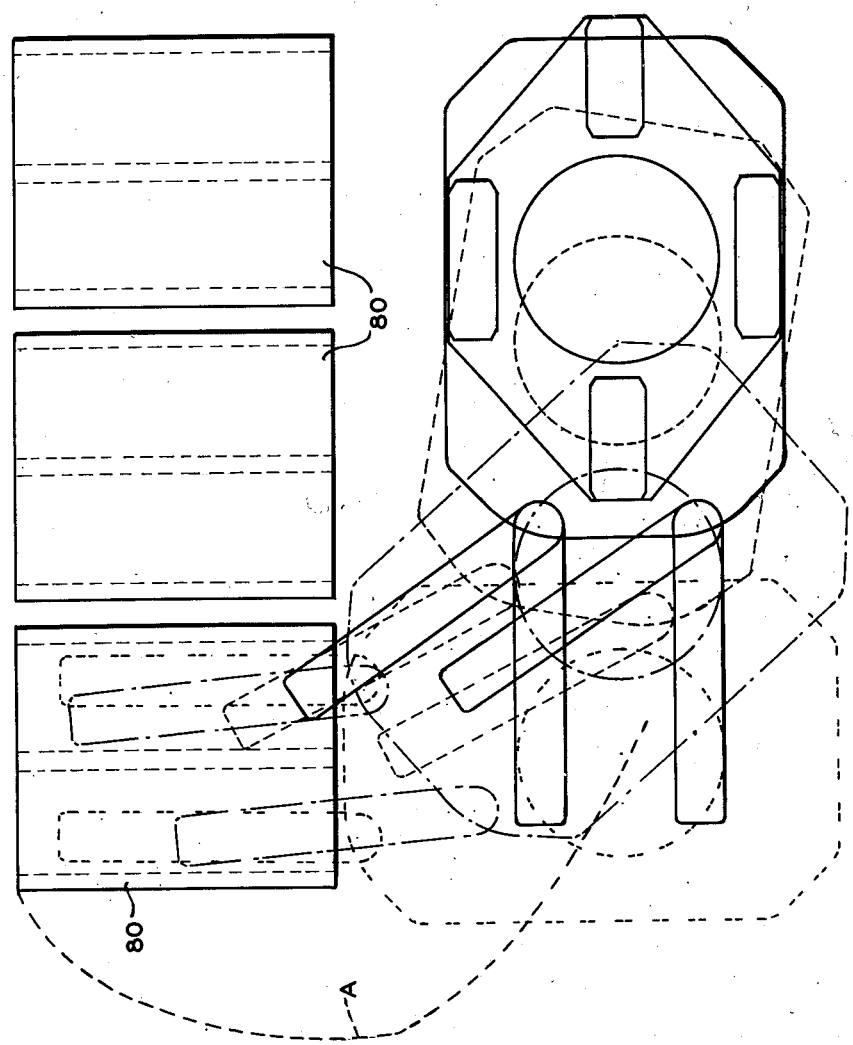
Figure 3 is a diagrammatic plan view of the truck and pivoted lift forks therefor in typical successive progressive positions thereof in picking up a pallet supported load.

Referring now to Figure 3, the truck 10 may be driven down an aisle along a row of stacked goods and stopped, as shown in the solid line position, adjacent one side of a pallet supported load 80 which is to be picked up. Now by edging the truck slowly forward while simultaneously revolving the upper main frame 33 toward the pallet and rotating the forks 43 and 44 first in the direction in which the upper main frame is being revolved as shown in the dotted line position and then in the reverse direction toward their normally forwardly projecting direction as shown in the broken line position, both the upper main frame and the forks may be located in alignment with the pallet simultaneously with the forks being disposed therebeneath as shown in the spaced dash position. The forks 43 and 44 may then be elevated until the pallet is raised from the ground, after which the upper main frame 33 is revolved back to its original forwardly extending position while simultaneously backing the truck.

The pallet supported load is then driven to the location where the load is to be deposited and is stopped adjacent one side of the location. The upper main frame 33 together with the load supporting means and pallet carried thereon are revolved while the truck is simultaneously edged forward until the pallet is in the desired position. Ample room is available at the end of a row at which the load is to be deposited, so that the forks need not be rotated about their pivotal connection to the load supporting means. The pallet supported load in effect is pivoted around the corner of the adjacent stack of goods in the row by the aforedescribed manipulation of the truck. The path A followed by the upper left hand corner of the pallet 80, as shown in Figure 3, deviates substantially less than the width of a pallet, from a plane passing through the left side of the pallet 80 when it is in an aligned position. It will be understood that when a pallet is removed or deposited at the right, the upper right hand corner of the pallet would deviate substantially less than the width of a pallet, from a plane passing through the right side of the pallet when in aligned position. After the pallet is lowered to the ground, the upper main frame 33 is revolved back to its original forwardly projecting position. While revolving the frame 33 back to its original position the forks 43 and 44 engage the side and center supports of the pallet and are pivoted about their pivotal connections 45 and 46, thus enabling them to be withdrawn from under the pallet.

It will thus be observed that the truck of our present invention is adapted for use in confined areas in which it would be impossible for conventional trucks to maneuver.

While we have shown what we consider to be certain preferred embodiments of our invention, it will be understood that various modifications and re-arrangements may be made therein without departing from the spirit and scope of our invention.

We claim:

1. An industrial truck comprising, a lower main frame having a pair of driving wheels one at each side of said frame intermediate of the ends thereof and a pair of steering wheels one at each end of said frame intermediate of the sides thereof, steering linkage between said steering wheels, an upper main frame rotatable relative to said lower main frame and having a mast at the forward end thereof, an upwardly extending hand steering wheel carried by said lower main frame and being operably connected to said steering linkage, said lower main frame having an operator's seat mounted to extend upwardly thereof, said upper main frame being formed with an opening through which said hand steering wheel and said operator's seat project, a ring gear secured to said upper main frame, and pinion means carried by said lower main frame for rotating said ring gear and said upper main frame therewith.

2. An industrial truck comprising, a lower main frame having a pair of driving wheels one at each side of said frame intermediate of the ends thereof and a pair of steering wheels one at each end of said frame intermediate of the sides thereof, steering linkage between said steering wheels, an upper main frame rotatable relative to said lower main frame and having a mast at the forward end thereof, an upwardly extending hand steering wheel carried by said lower main frame and being operably connected to said steering linkage, said lower main frame having an operator's seat mounted to extend upwardly thereof, said upper main frame being formed with an opening through which said hand steering wheel and said operator's seat project, a ring gear secured to said upper main frame, pinion means carried by said lower main frame and having meshing engagement with said ring gear, motor means mounted on said lower main frame for driving said pinion means, load supporting means carried by said mast, comprising forks adapted to extend normally substantially horizontally and forwardly of the truck, and means for each of said forks for pivotally mounting the same in their normal position rearwardly thereof about a substantially vertical axis.

3. An industrial truck comprising a lower main frame and an upper main frame rotatable relative to said lower main frame, a prime mover on said lower main frame for effecting movement of said truck said prime mover being located at one side of said truck generally laterally of a vertical median plane extending lengthwise of said truck, said lower main frame having an operator's seat mounted to extend upwardly thereof at the other side of said truck laterally of said vertical median plane extending lengthwise of said truck, and said upper main frame being formed with an opening through which said operator's seat projects.

4. An industrial truck comprising, a lower main frame having a pair of driving wheels one at each side of said frame intermediate of the ends thereof and a pair of steering wheels one at each end of said frame intermediate of the sides thereof, steering linkage between said steering wheels, an upper main frame rotatable relative to said lower main frame and having a mast at the forward end thereof, an upwardly extending hand steering wheel carried by said lower main frame and being operably connected to said steering linkage, said lower main frame having an operator's seat mounted to extend upwardly thereof, said upper main frame being formed with an opening through which said hand steering wheel and said operator's seat project, a ring gear secured to said upper main frame, pinion means carried by said lower main frame for rotating said ring gear and said upper main frame therewith, a prime mover on said lower main frame for effecting rotation of said drive wheels, said prime mover being located at one side of said truck centrally of the ends thereof and generally laterally of a vertical median plane extending lengthwise of said truck, and said operator's seat being located at the other side of said truck laterally of said vertical median plane extending lengthwise of said truck and rearwardly of a vertical plane passing through the axis of the drive wheels of the truck.

5. The truck of claim 4 wherein load supporting means is provided for said mast comprising, forks adapted to extend normally substantially horizontally and forwardly of the truck, and means for each of said forks for pivotally mounting the same in their normal position rearwardly thereof about a substantially vertical axis.

6. The truck of claim 5 wherein a counterweight is provided at the rear end of said upper main frame.

7. An industrial truck comprising a lower main frame and an upper main frame rotatable relative to said lower main frame, a ring gear secured to said upper main frame, pinion means on said lower main frame and having meshing engagement with said ring gear, means on said lower main frame for rotating said pinion, a prime mover on said lower main frame for effecting movement of said truck, said prime mover being located at one side of said truck generally laterally of a vertical median plane extending lengthwise of said truck, said lower main frame having an operator's seat mounted to extend upwardly thereof at the other side of said truck laterally of said vertical median plane extending lengthwise of said truck, and said upper main frame being formed with an opening through which said operator's seat projects.

MORRIS R. ELLIOTT.
GEORGE L. TURNER.

REFERENCES CITED

The following references are of record in the file of this patent:

UNITED STATES PATENTS

| Number | Name | Date |
|---|---|---|
| 1,130,314 | McKaig | Mar. 2, 1915 |
| 1,610,502 | Fairbanks et al. | Dec. 14, 1926 |
| 1,978,170 | Roesner | Oct. 23, 1934 |
| 2,067,546 | Rocher | Jan. 12, 1937 |
| 2,234,851 | Asper | Mar. 11, 1941 |
| 2,271,624 | Cochran | Feb. 3, 1942 |
| 2,298,196 | Cochran | Oct. 6, 1942 |
| 2,477,789 | Dunham | Aug. 2, 1949 |

FOREIGN PATENTS

| Number | Country | Date |
|---|---|---|
| 327,795 | Great Britain | Apr. 17, 1930 |
| 499,033 | Germany | May 30, 1930 |
| 661,995 | Germany | July 1, 1938 |